(No Model.)
A. MILLET.
CANE STUBBLE SHAVER AND DESTROYER.
No. 339,916. Patented Apr. 13, 1886.
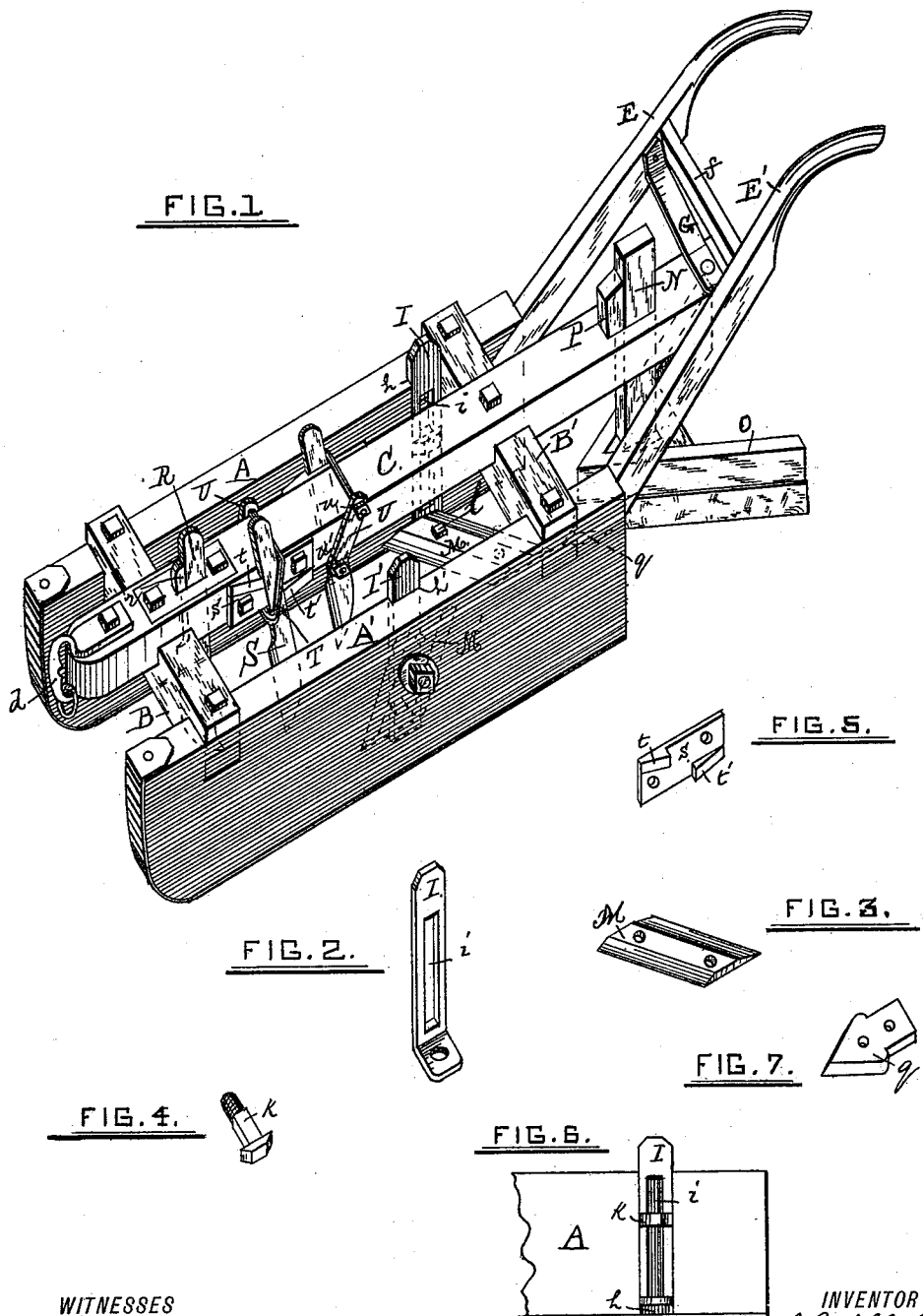
WITNESSES
J. M. Jenkins.
E. L. L. Zeller.
INVENTOR
A. Millet
By his Attorney
H. N. Jenkins

UNITED STATES PATENT OFFICE.

ADELARD MILLET, OF ST. JOHN BAPTIST PARISH, LOUISIANA.

CANE-STUBBLE SHAVER AND DESTROYER.

SPECIFICATION forming part of Letters Patent No. 339,916, dated April 13, 1886.

Application filed August 3, 1885. Serial No. 173,452. (No model.)

*To all whom it may concern:*

Be it known that I, ADELARD MILLET, a citizen of the United States, residing in the parish of St. John Baptist, State of Louisiana, have invented new and useful Improvements in Cane-Stubble Shavers and Destroyers, of which the following is a full and exact description, reference being had to the accompanying drawings, making part of this specification.

This invention is more especially intended for use on sugar-plantations; and it consists in certain improvements in that class of field implements which are employed at certain seasons of the year for cutting or shaving the cane stumps or "stubble" remaining in the ground from the previous season, and for removing a portion of the earth covering same, in order that the sprouts or shoots therefrom may meet with but little resistance; or the implement may be employed for destroying and removing said stubble, so that seed-canes may be planted in lieu thereof.

In the accompanying drawings, Figure 1 is a perspective view of my invention as complete and ready for use. Fig. 2 is a detailed view of one of the shaving-knife standards. Fig. 3 is a similar view of a reversible knife. Fig. 4 is a like view of a bolt for securing the knife-standard to its runner. Fig. 5 is a perspective view of a plate adapted to be secured to the side of the beam for the purpose of holding the colter in a given position. Fig. 6 is a section of one of the runners, showing the manner in which the knife-standard is connected therewith; and Fig. 7 is a cutting-point adapted to be secured to the forward end of the scraper when it is desired to dig out or entirely remove the stubble.

The letters A A' designate a pair of runners, the lower and front edges of which are faced with iron, to resist wear by friction, as well as to limit the downward movement of the knife-standards. These runners are rigidly connected at suitable distance apart by a pair of cross-ties, B B', above which is secured, midway between the runners, a beam, C, having a clevis, *d*, bolted to its forward end, as in ordinary field implements intended to be drawn by draft-animals.

To the rear of the runners are secured a pair of handles, E E', which are connected with each other by a rod, *f*, and with the rear end of the beam by an iron brace, G.

The inner surface of the runners are each provided with a vertical slot, one in advance of the other, as shown at *h h'*. These slots are in depth and width equal to that of the knife-standards I I', and extend from the upper edges of the runners to the iron-bound lower portions of same.

The standards I I' are provided with vertical slots *i*, for the reception of bolts *k*, whereby they are secured at any desired elevation, the stems of said bolts being adapted to pass through holes formed in the recessed portions of the runners, where they are held by suitable nuts and washers, as shown.

The lower ends of the standards I I' are bent inwardly at right angles to the stems thereof, and the said ends are provided with suitable holes for the reception of bolts *l*, whereby the shaving knives or cutters M M' are secured thereto. The said knives are provided with front and rear cutting-edges, and their ends are beveled or cut at an angle thereto, and provided with bolt-holes, as shown, whereby they are adapted to be reversed on the standard, to which they are secured in rearwardly-inclined positions, so as to meet with less resistance and make cleaner cuts than if arranged to strike the stubble at a right angle.

The aforesaid knives are made sufficiently long to slightly extend beyond the center of the implement, so as to insure the cutting of all stubble in the row.

The beam is provided near its rear end with a vertical aperture for the reception of the standard N of a scraper, O, which is employed for throwing the cut or loosened material to the sides of the machine. This standard can be adjusted to any desired height, and secured at the requisite elevation by a wedge or key, as shown at P.

The letter *q* designates a pointed cutter, the width of which is about equal to that of an ordinary cane hill or row. This cutter is provided with suitable holes for the reception of wood-screws or bolts, whereby it is adapted to be secured to the under part of the scraper at such times as the implement is to be used in digging out or entirely removing the stubble, at which time I also employ a series of colters in addition to the aforesaid parts. These colters are arranged and secured to the beam in the following manner: The forward colter, R, is fitted in a mortise made through the center of the beam immediately in rear of the front cross-tie, B, wherein it is adjustably secured by a wedge or key, r. The beam is provided at the upper and lower ends of the said mortise with metal plates, to insure greater solidity to the colter.

In rear of the colter R, and at one side of the beam, is secured a metal plate, s, having lugs t t' at the upper front and lower rear corners thereof, with space between same adapted to receive the standard of a second colter, S, which is secured in position by a stirrup, T, having ends of sufficient length to straddle the beam and be secured thereto by a clamp, U, and nuts u u', as shown, in connection with a third colter, W, which is secured in a similar manner to the opposite side of the beam in rear of the second colter, as shown.

The front edge of each colter is made sharp, and all the colters are inclined rearwardly, so as to first strike the top of the stubble, and thus insure the splitting of same as the machine moves forward.

When the implement is used for exterminating the stubble, the reversible knives and their standards may be raised or entirely removed; but this is not advised, for the reason that their employment will relieve the scraper of unnecessary pressure and labor.

Having described my invention, what I claim as new, and desire to secure by Letters Patent, is—

1. The combination, in a cane scraper and destroyer, of a pair of runners provided with adjustable scrapers, and a central beam secured to the cross-ties connecting same, with the colters R S W, secured to the beam in different lines of travel, the colter R adapted to operate in front of the colter S and the colter W in rear thereof, substantially as described, and for the purpose set forth.

2. In combination with a pair of runners and connecting ties or beams, a series of sharp-edged colters successively arranged on the beam in different lines of travel, as set forth, and an adjustable scraper provided with a cutting-point having a width about equal to that of an ordinary cane-row, the colter adapted to split the stubble, and the scraper-point and scraper to dig out and remove the same, substantially as set forth.

In testimony whereof I affix my signature in presence of two witnesses.

ADELARD MILLET.

Witnesses:
R. C. HILL,
P. M. HILL.